United States Patent
Razeghi

(10) Patent No.: US 12,241,448 B2
(45) Date of Patent: Mar. 4, 2025

(54) SEGMENTED WIND TURBINE BLADE

(71) Applicant: BLADE DYNAMICS LIMITED, Eastleigh (GB)

(72) Inventor: Rama Razeghi, Eastleigh (GB)

(73) Assignee: BLADE DYNAMICS LIMITED, Eastleigh (GB)

( * ) Notice: Subject to any disclaimer, the term of this patent is extended or adjusted under 35 U.S.C. 154(b) by 111 days.

(21) Appl. No.: 17/801,912

(22) PCT Filed: Apr. 28, 2020

(86) PCT No.: PCT/EP2020/061708
§ 371 (c)(1),
(2) Date: Aug. 24, 2022

(87) PCT Pub. No.: WO2021/219198
PCT Pub. Date: Nov. 4, 2021

(65) Prior Publication Data
US 2023/0083629 A1    Mar. 16, 2023

(51) Int. Cl.
*F03D 1/06* (2006.01)
*F03D 13/10* (2016.01)

(52) U.S. Cl.
CPC ...... *F03D 1/0675* (2013.01); *F05B 2240/302* (2013.01); *F05B 2280/6003* (2013.01)

(58) Field of Classification Search
CPC ............ F05B 2240/302; F05B 2230/60; F05B 2280/6003; F05B 2260/301; F05B 2250/292; F05B 2230/23; F05B 2230/50; F05B 2230/604; F05B 2260/30; F05B 2240/301; F05B 2240/221; F05B 2240/30; F03D 1/0675; F03D 13/10; F03D 1/0658; F03D 1/0633; F03D 1/065; Y02E 10/72; Y02P 70/50
See application file for complete search history.

(56) References Cited

U.S. PATENT DOCUMENTS 7,922,454 B1 * 4/2011 Riddell .................. F03D 80/30
416/224
7,998,303 B2 * 8/2011 Baehmann ............ F03D 1/0675
156/305

(Continued)

FOREIGN PATENT DOCUMENTS

EP         3098440 A1    11/2016

*Primary Examiner* — Eric J Zamora Alvarez
(74) *Attorney, Agent, or Firm* — Nath, Goldberg & Meyer; Jerald L. Meyer; Tanya E. Harkins

(57) ABSTRACT

A segmented wind turbine blade comprises a first blade segment and a second blade segment connected to the first blade segment by means of male spar part protruding from the second blade segment and received in the cavity of a female spar part of the first blade segment.
The first blade segment comprises a spar cap bonded to an inner surface of a shell portion of the first blade segment.
The spar cap comprises a longitudinally extending scarf connection between a first spar cap portion made from pultrusions and a second spar cap portion being bonded to an outer surface of the female spar part, wherein the longitudinally extending scarf connection is spaced from, adjoins or partially overlaps the longitudinal inner end of the female spar part in the longitudinal direction of the blade.

21 Claims, 5 Drawing Sheets

(56) References Cited

U.S. PATENT DOCUMENTS

| | | | | |
|---|---|---|---|---|
| 8,167,569 | B2* | 5/2012 | Livingston | F03D 1/0675 |
| | | | | 416/224 |
| 10,760,545 | B2* | 9/2020 | Yarbrough | F03D 1/0675 |
| 11,767,819 | B2* | 9/2023 | Huth | F03D 1/0675 |
| | | | | 416/233 |
| 2014/0169978 | A1* | 6/2014 | Livingston | F03D 1/0675 |
| | | | | 264/263 |
| 2018/0051672 | A1 | 2/2018 | Merzhaeuser et al. | |
| 2018/0171968 | A1* | 6/2018 | Hunter | F03D 1/0675 |
| 2022/0072189 | A1 | 3/2022 | Signorino et al. | |

* cited by examiner

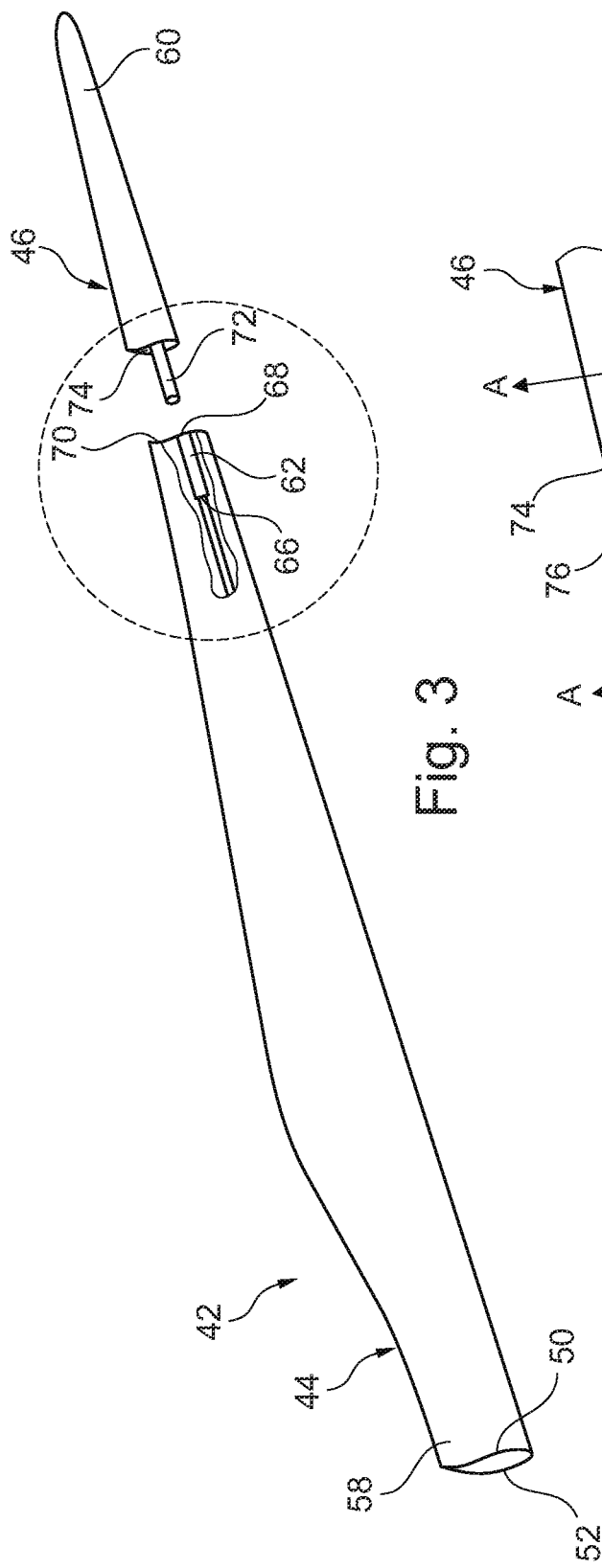
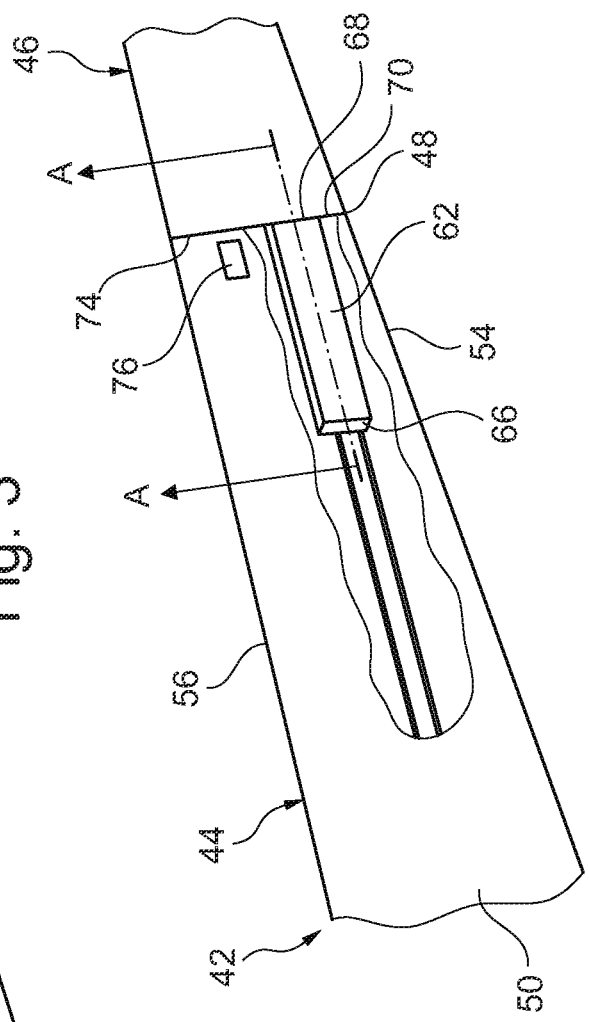
Fig. 3
Fig. 4

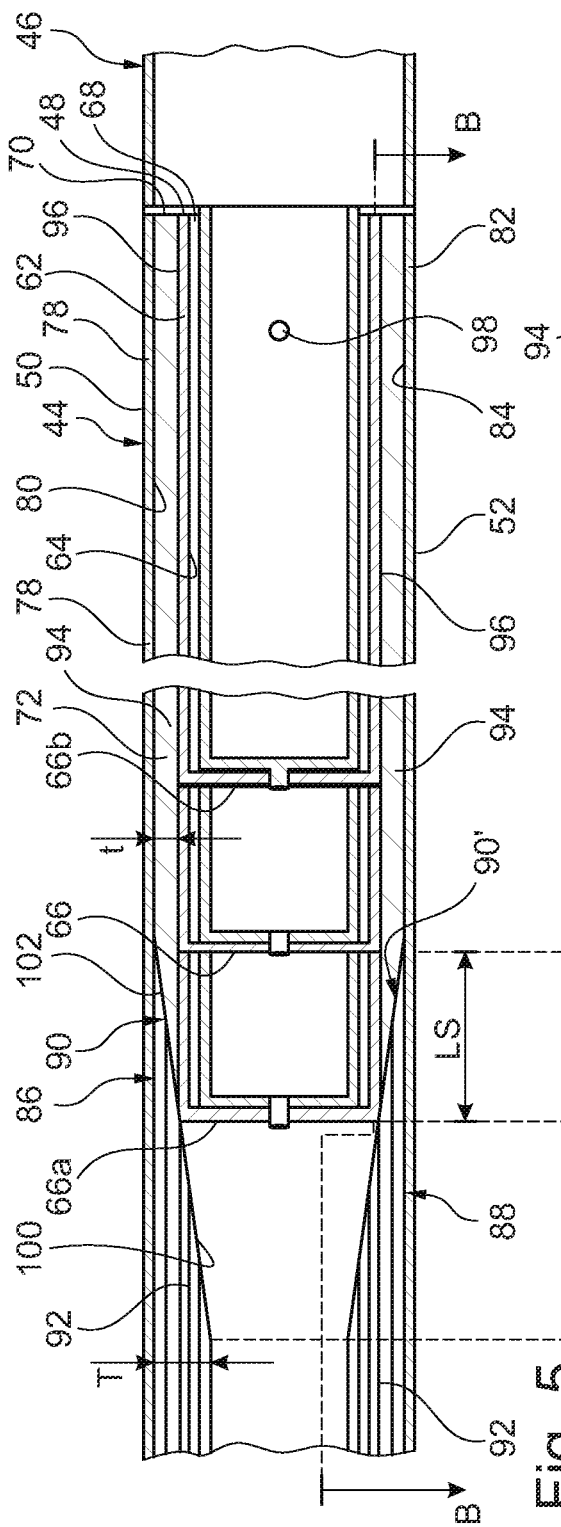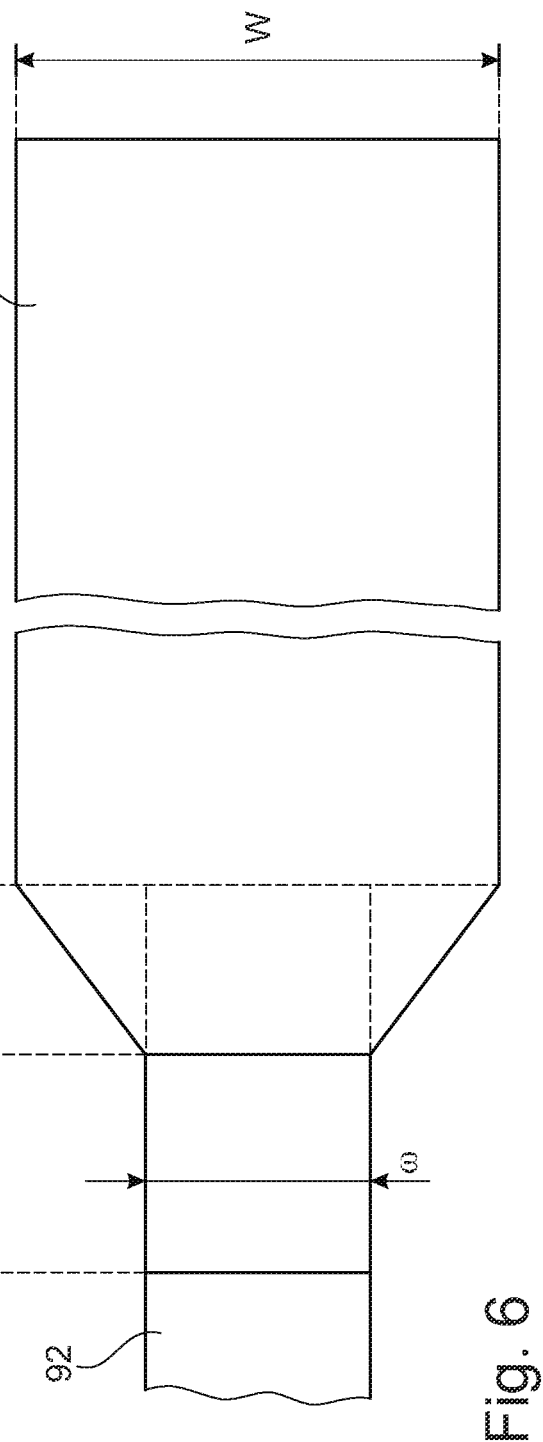

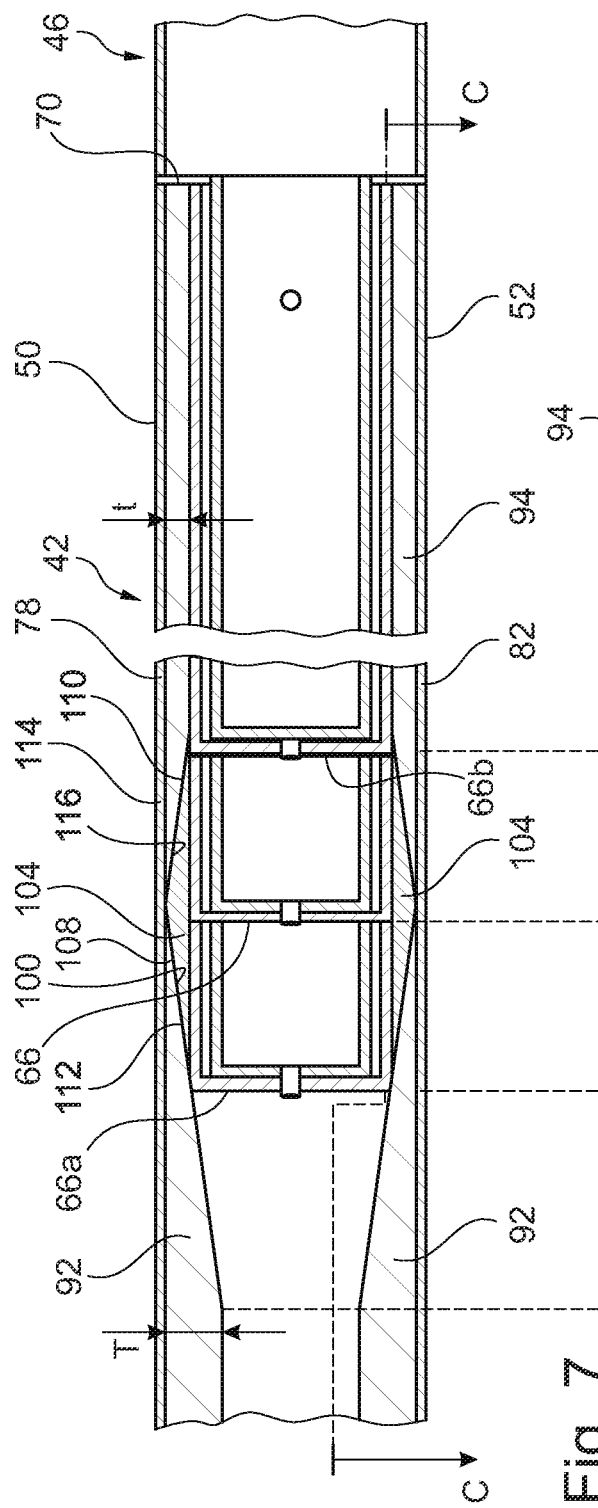
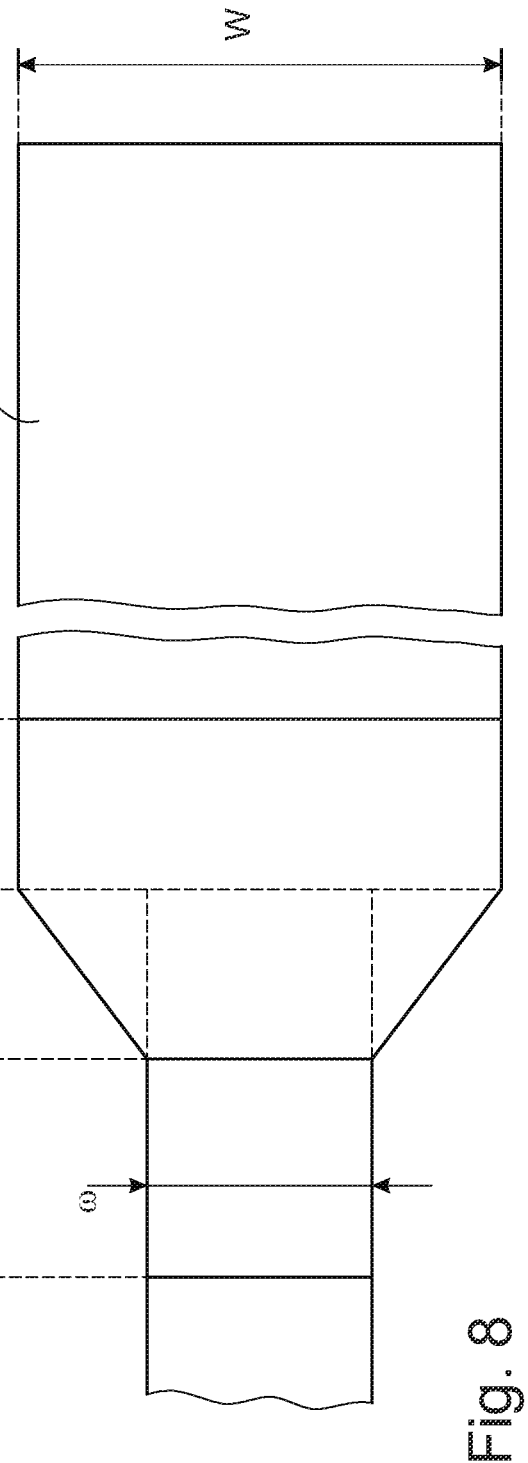
Fig. 7
Fig. 8

SEGMENTED WIND TURBINE BLADE

This is a National Phase Application filed under 35 U.S.C. 371 as a national stage of PCT/EP2020/061708, filed Apr. 28, 2020, the content of which is hereby incorporated by reference in its entirety.

FIELD OF THE INVENTION

The present invention relates generally to segmented wind turbine blades comprising a first blade segment comprising a female spar part and a second blade section comprising a male spar part received in a cavity of the first spar part, more particularly the present invention relates to the structure of spar caps in the first blade segment.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Spar caps or main laminates are placed or integrated in the shell halves and may be combined with shear webs or spar beams to form structural support members. Spar caps or main laminates may be joined to, or integrated within, the inside of the suction and pressure halves of the shell.

As the size of wind turbines increases, the manufacturing and transporting of wind turbine blades becomes more challenging and costly. To address this, it is known to provide a wind turbine blade in two or more segments. This may result in an easier manufacturing process and may reduce the cost of transportation and erection of wind turbines. The blade segments may be transported to the erection site where they can be assembled to form the wind turbine blade.

However, several challenges are associated with such design, relating to the manufacturing and joining of the shell segments including load bearing structures such as spars, shear webs or other internal components. Problems may arise in obtaining the desired slim shape of the airfoil region of the blade and the desired and necessary strength of the segmented blade in the connection area between the female spar part of the first blade segment and the male spar of the second blade segment.

It is therefore the object of the present invention to provide a segmented wind turbine blade eliminating or reducing the above problem in the mentioned connection area.

Particularly it is an object of the present invention to provide a segmented wind turbine blade where the structure of the connection area has the desired and necessary strength with no or minimal impact on the blade performance, such as aerodynamic properties.

SUMMARY OF THE INVENTION

One or more of the above objects and additional objects is obtainable by segmented wind turbine blade having a profiled contour including a pressure side and a suction side, and a leading edge and a trailing edge with a chord extending therebetween, the wind turbine blade extending in a longitudinal direction between a root end and a tip end and comprises as seen in longitudinal direction:

a first blade segment comprising a female spar part defining an inner cavity and having a longitudinal inner end and an opposite longitudinal open end at an end face of the first blade segment, a second blade segment connected to the first blade segment at a chord-wise joint and comprising a male spar part having a protruding portion protruding at the joint from an end face of the second blade segment and extending through the longitudinal open end of and into the cavity of the female spar part to be received therein, the blade additionally comprises locking means mutually locking the female and male spar part and thereby the first and second blade segment, and a pressure side spar cap connected to an inner surface of a pressure side shell portion of the first blade segment and a suction side spar cap connected to an inner surface of a suction side shell portion of the first blade segment extend from the end face thereof longitudinally over at least a majority of the extent of the first blade segment wherein at least one of the pressure side spar cap and the suction side spar cap of the first blade segment comprises a longitudinally extending scarf connection between a first spar cap portion made from pultrusions and a second spar cap portion connected to an outer surface of the female spar part, wherein the longitudinally extending scarf connection is spaced from, adjoins or partially overlaps the longitudinal inner end of the female spar part in the longitudinal direction of the blade.

By the term extend over at least a majority of the extent of the first blade segment is to be understood extend along at least 51%, or at least 60%, or at least 70%, or at least 80%, or at least 90% of the extent of the first blade segment.

By the term pultrusions is to be understood a single pultruded member or a plurality stacked and mutually connected pultruded members being manufactured from a pultrusion process.

By the term adjoins is to be understood that the distance from the end of the first spar cap portion of the scarf connection to the end face of the first blade segment is essentially the same as the distance from the inner end of the female spar part to the end face of the first blade segment.

The longitudinally extending scarf connection between a first spar cap portion made from pultrusions and a second spar cap portion being bonded to the second spar cap portion allow for a gradual transition from the first spar cap portion to the second spar cap portion having dimensions, such as width and/or thickness different from that of the first spar cap portion and obtain the desired and necessary strength and shape and the first blade segment in the area thereof comprising the female spar part.

According to an embodiment both the pressure side spar cap and the suction side spar cap of the first blade segment comprises a longitudinally extending scarf connection between a first spar cap portion made from pultrusions and a second spar cap portion, wherein the longitudinally extending scarf connection is spaced from, adjoins or partially overlaps the longitudinal inner end of the female spar part in the longitudinal direction of the first blade segment.

The longitudinally extending scarf connection can be spaced 0 to 12 meters, such as 0 to 10 meters or 0 to 8 meters or 0 to 5 meters or 0 to 3 meters from the inner end of the female spar part.

The pultrusions of the first spar cap portion of the pressure side spar cap and/or the suction side spar cap portion can be made from carbon fibres or at least a majority of carbon fibres.

The second spar cap portion can be made from a pre-infused piece made from fibres, such as carbon fibres, glass fibres or a mixture of carbon and glass fibres.

The longitudinally extending scarf connection between the first spar cap portion and the second spar cap portion can be a direct connection between the first spar cap portion made from pultrusions and the second spar cap portion.

The taper (slope) of the longitudinally extending scarf connection between the first spar cap portion and the second spar cap portion is 1:5 (20%) to 1:200 (0.5%), such as 1:10 (10%) to 1:125 (0.8%).

Adhesive or a prepreg layer can be provided in the longitudinally extending scarf connection between the first spar cap portion and the second spar cap portion.

According to an embodiment the longitudinally extending scarf connection between the first spar cap portion and the second spar cap portion is formed by an infill piece forming a double scarf joint with a first scarf connection directly to the first spar cap portion and a second scarf connection directly to the second spar cap portion.

The infill piece can be a pre-infused piece made from fibres, such as carbon fibres, glass fibres or a mixture of carbon and glass fibres.

The taper (slope) of the first scarf connection and the second scarf connection of the double scarf joint can be 1:5 (20%) to 1:200 (0.5%), such as 1:10 (10%) to 1:125 (0.8%).

Adhesive or a prepreg layer can be provided in the first scarf connection of the double scarf joint between the first spar cap portion and the infill piece and the second scarf connection between the infill piece and the second spar cap portion.

The tapering of the longitudinally extending scarf connection can extend into the area of the first spar cap portion made from pultrusions in front of the scarf connection to thereby gradually reduce the thickness of the first spar cap portion in front of the scarf connection The first spar cap portion made from pultrusions can have a first thickness and the second spar cap member have a second thickness, the second thickness of the second spar cap being smaller than the first thickness of the first spar cap portion, such as at least 30%, 40, or 50% smaller.

The first spar cap portion made from pultrusions can have a first width and the second spar cap member have a second width, the second width of the second spar cap being larger than the first width of the first spar cap portion, such as at least 50%, 100% or 150% larger than the first width of the first spar cap portion.

The second thickness and the second width of the second spar cap portion can be decreased respective increased relative to the first thickness and the first width of the first spar cap portion in order to obtain sufficient strength of the second spar cap portion and/or the desired strength of the second spar cap portion.

The second thickness and the second width of the second spar cap portion can be decreased respective increased relative to the first thickness and the first width of the first spar cap portion in order to obtain essentially the same cross-sectional area or strength of the first and second spar cap portion.

The locking means can mutually lock the female and male spar part and thereby the first and second blade segment comprises pin joints between the female spar part and the male spar part.

The inner cavity the female spar part can have a rectangular cross-sectional shape.

The female spar part can have a rectangular outer shape in a cross-sectional view.

The first blade segment can constitute 30-90%, such as 40-80% of the entire longitudinal extent of the blade.

The first blade segment can comprise the root end of the blade and can be considered the root end segment of the blade, and the second blade segment can comprise the tip end of the blade and can be considered the tip end segment of the blade.

BRIEF DESCRIPTION OF THE DRAWINGS

The invention is explained in detail below with reference to embodiments shown in the drawings, in which FIG. 3 is a schematic cut-open view of an exemplary segmented wind turbine blade according to the present invention before joining a first and a second blade segment thereof, FIG. 4 is an enlarged view of the encircled section in FIG. 3, after the first and second blade segments thereof have been joined at a joint, FIG. 5 is an enlarged sectional view along the line A-A in FIG. 4 of a first embodiment of the wind turbine blade according to the invention after the first and second blade segments thereof have been joined at a joint.

FIG. 6 is a sectional view along the line B-B in FIG. 5,

FIG. 7 is an enlarged sectional view along the line A-A in FIG. 4 of a second embodiment of the wind turbine blade according to the invention after the first and second blade segments thereof have been joined at a joint, and FIG. 8 is a sectional view along the line C-C in FIG. 7,

DETAILED DESCRIPTION OF THE INVENTION

Embodiments of the invention will be described in more detail in the following with reference to the accompanying figures. The figures show one way of implementing the present invention and are not to be construed as being limiting to other possible embodiments falling within the scope of the attached claim set.

Figure 1:
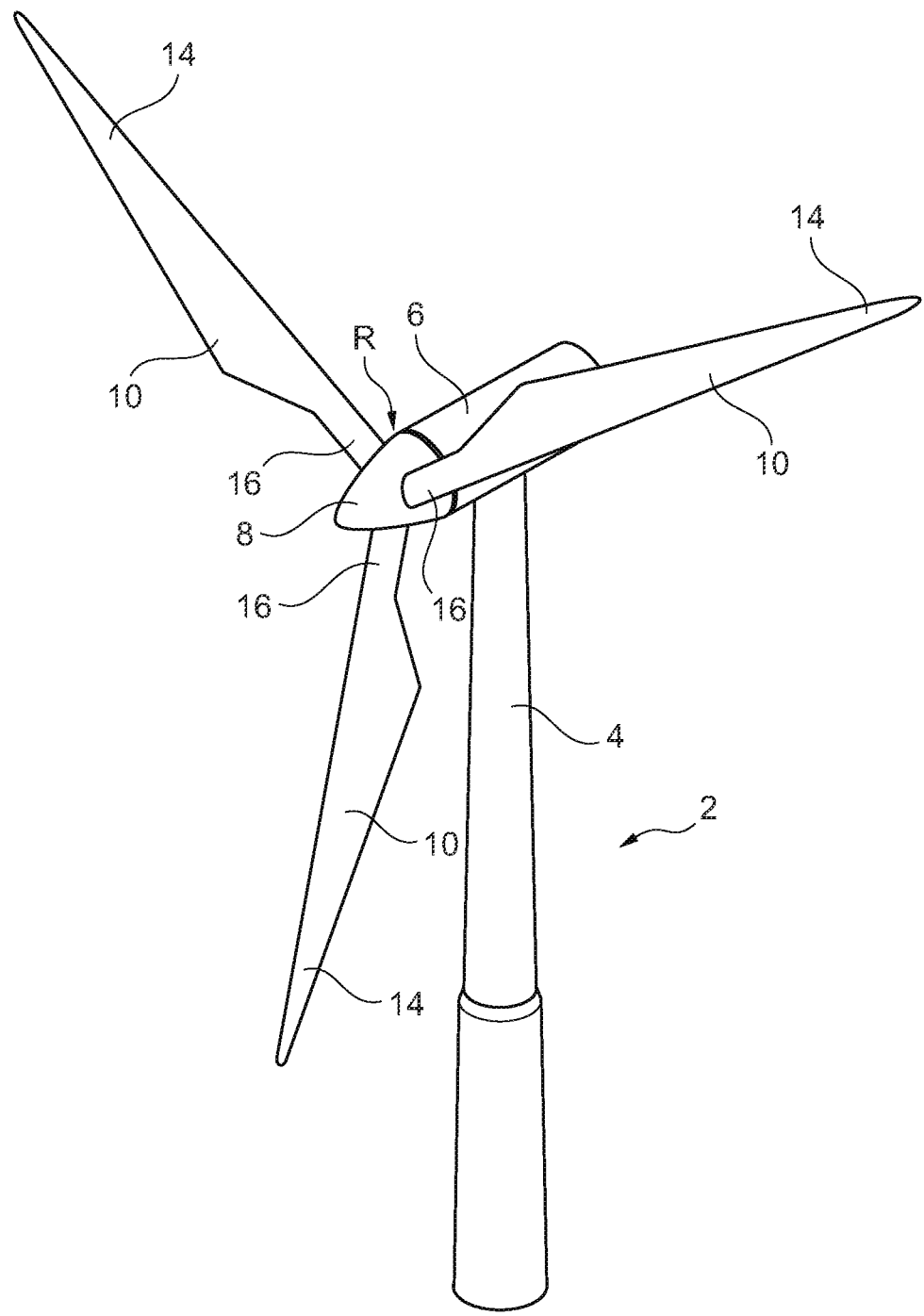
FIG. 1 is a schematic illustration of an exemplary wind turbine wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
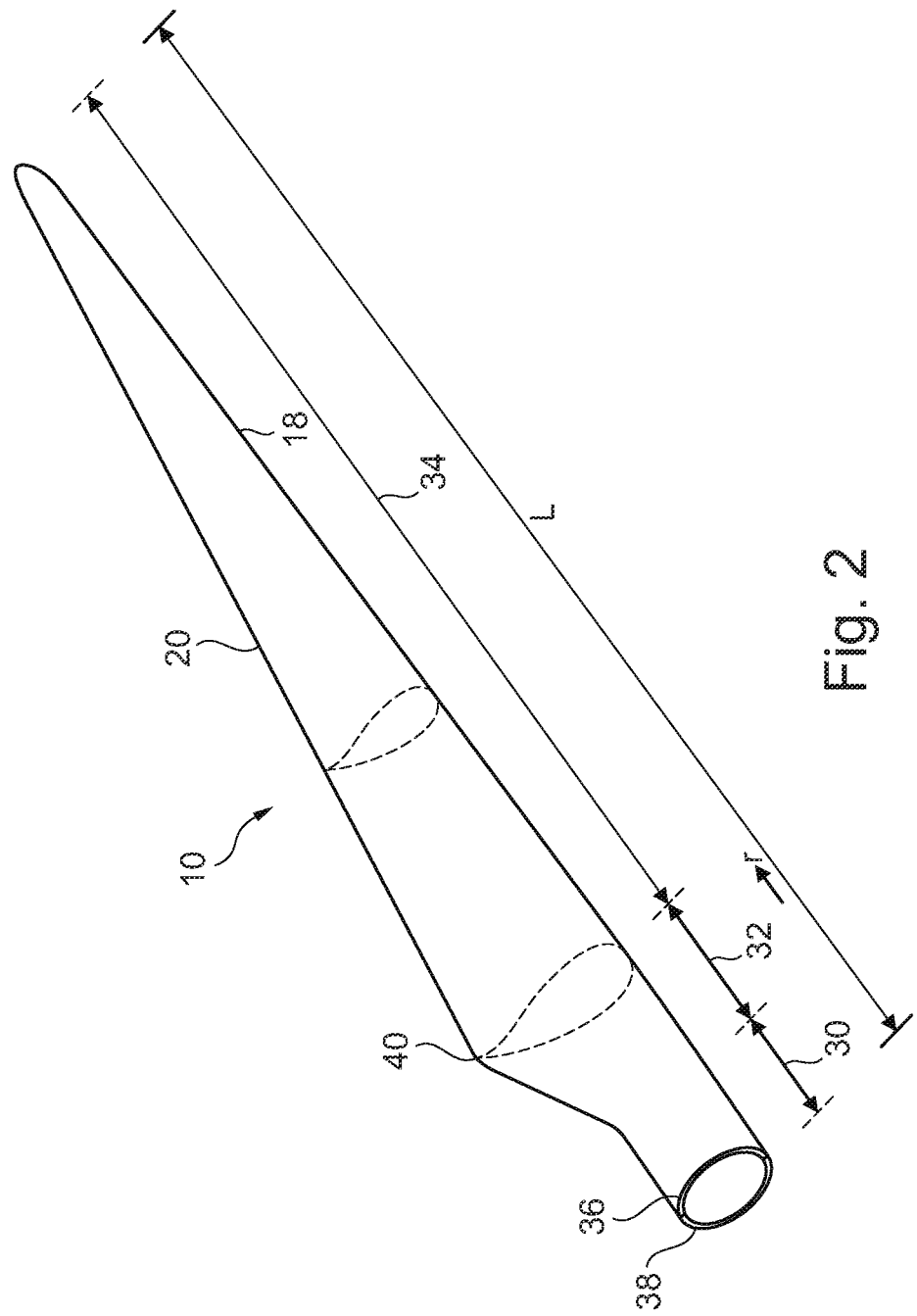
FIG. 2 is a schematic illustration of an exemplary wind turbine blade.

FIG. 2 shows a schematic view of an exemplary wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Reference is now made to FIG. 3 and FIG. 4, where FIG. 3 shows a schematic view of a schematic cut-open view of an exemplary segmented wind turbine blade 42 according to the present invention before joining a first blade segment 44 and a second blade segment 46 thereof, and FIG. 4 is an enlarged view of the encircled section in FIG. 3, after the first and second blade segments 44, 46 thereof have been joined at a chord-wise joint 48. Additionally, reference is made to FIG. 5 and FIG. 6, where FIG. 5 is an enlarged sectional view along the line A-A in FIG. 4 of a first embodiment of the segmented wind turbine blade according to the invention after the first and second blade segments thereof have been joined at the joint and FIG. 6 is a sectional view along the line B-B in FIG. 5.

The blade 42 comprises a pressure side 50 of a pressure side shell portion 78 and a suction side 52 of a suction side shell portion 82 and a leading edge 54 and a trailing edge 56 and extends between a root end 58 and a tip end 60 as seen in longitudinal direction. The above shell portions and segments thereof are typically manufactured by vacuum assisted resin transfer moulding (VARTM).

The first blade segment 44 comprises the root end 58 of the blade and can be considered the root end segment of the blade, and the second blade segment 46 comprises the tip end 60 of the blade and can be considered the tip end segment of the blade.

The first blade segment 44 comprises a female spar part 62 having a rectangular outer shape in a cross-sectional view and having an inner cavity 64 with a rectangular cross-sectional shape. The female spar part has a longitudinal inner end 66 and an opposite longitudinal open end 68 at an end face 70 of the first blade segment 44.

The second blade segment 46 comprises a male spar part having a protruding portion portion 72 protruding at the joint 48 from an end face 74 of the second blade section 46 and into the cavity of the female spar part 62 to be received therein.

The blade additionally comprises locking means mutually locking the female spar part 62 and the protruding portion 72 of the male spar part and thereby the first blade segment 44 and the second blade segment 46. The locking means comprises as shown in FIG. 5 at least one pin joint 98 between the female and male spar parts. The pin joint comprises an opening in the female and male spar parts and a pin extending through the opening. The pin joint is accessible through an access opening 76 in the blade shell.

The first blade segment 44 comprises a pressure side shell portion 78 having an inner surface 80 and a suction side shell portion 82 having an inner surface 84. A pressure side spar cap 86 is connected to the inner surface 80 of the pressure side shell portion 78 and extends longitudinally over at least a majority of the extent of the first blade segment 44 and a suction side spar cap 88 is connected to the inner surface 84 of the suction side shell portion 82 and extends longitudinally over at least a majority of the extent of the first blade segment 44.

Both the pressure side spar cap 86 and the suction side spar cap 88 comprises a longitudinally extending scarf connection 90 between a first spar cap portion 92 and a second spar cap portion 94. The first spar cap portion 92 is made from pultrusions of carbon fibres. The second spar cap portion 94 is a pre-infused piece made from fibres, such a carbon fibres or glass fibres or a mixture of carbon and glass fibres and connected to an adjacent outer surface 96 of the female spar part 62.

The first spar cap portion 92 is made from pultrusion has a first thickness T and comprises a first tapering end face 100 tapering towards the end face 70 of the first blade segment 44. The second spar cap portion has a second thickness t smaller than the first thickness T and comprises a second tapering end face 102 tapering in opposite direction of the first tapering end face 100 of the first spar cap portion. The length of the tapering end face 100 of the first spar cap portion 92 is longer than the length of the tapered end face 102 of the second spar cap portion 94 in order to reduce the thickness of the first spar cap portion 100 forming a part of the scarf connection 90. In the scarf connection 90 the second tapered end face 102 overlaps a portion of the first tapered end face 100 and the end faces are mutually connected in the overlap providing a thickness of the scarf connection corresponding essentially to the thickness t of the second spar cap portion 94. Adhesive or a prepreg layer can advantageously be provided in the scarf connection 90 between the first spar cap portion 92 and the second spar cap portion 94. The taper of the overlap of the mutually connected tapered end faces defines the taper of the scarf connection. The length of the overlap defines the length LS of the longitudinally extending scarf connection 90. The longitudinally extending scarf connection 90 partially overlaps the longitudinal inner end 66a of the female spar part 62 in the longitudinal direction of the blades, as shown by dotted lines in FIG. 5, or adjoins the longitudinal inner end 66 of the female spar part 62 in the longitudinal direction of the blades, as shown by solid lines in FIG. 5 or is spaced from the longitudinal inner end 66b of the female spar part 62 in the longitudinal direction of the blades, as shown by bold lines in FIG. 5. The spacing between the longitudinally extending scarf connection and the inner end of the female spar part can be 0 to 12 meters, such as 0 to 10 meters or 0 to 8 meters or 0 to 5 meter or 0 to 3 meters. It should be noted that the taper of the scarf connection shown in the drawings is larger than for a real wind turbine blade where the taper typically is 1:5 to 1:200.

The first spar cap portion 92 made from pultrusions has in the disclosed example a thickness T being twice the thickness t of the second spar cap portion 94. Corresponding to the above gradual reduction of the thickness of first spar cap portion 92 in the tapered end face 100 thereof the width of the second spar cap portion 94 is, starting at longitudinally extending scarf connection 90, gradually increased from a first width w essentially corresponding to the width of the first spar cap portion 92 to a larger second width W in order to obtain sufficient strength of the second spar cap portion 94. In the example disclosed the second width W of the second spar cap portion 94 essentially twice the first width w.

Reference is now made to FIG. 7 and FIG. 8, where FIG. 7 is an enlarged sectional view along the line A-A in FIG. 4 of a second embodiment of the segmented wind turbine blade according to the invention after the first and second blade segments thereof have been joined at a joint, and FIG. 8 is a sectional view along the line C-C in FIG. 7.

The second embodiment of the present invention essentially only differs from the above described first embodiment in that the scarf connection between the first spar cap portion 92 and the second spar cap portion 94 is not a direct scarf connection 90 between the first spar cap portion 92 and the second spar cap portion 94 as disclosed in the first embodiment. In the second embodiment of the segmented blade the longitudinally extending scarf connection between the first spar cap portion 92 and the second spar cap portion 94 is formed by an infill piece 104 forming a double scarf joint 106 with a first scarf connection 108 directly to the first spar cap portion 92 and a second scarf connection 110 with the second spar cap portion 92.

The infill piece 104 is a pre-infused piece made from fibres such as carbon fibres, glass fibres or a mixture of carbon and glass fibres. Not shown adhesive or a prepreg layer can be provided in the first scarf connection 108 between the first spar cap portion 92 and the infill piece 104 and in the second scarf connection 110 between the infill piece 104 and the second spar cap portion 94.

The first scarf connection 108 between the first spar cap portion 92 and the infill piece 104 is a connection between the tapering end face 100 of the first spar cap portion 92 tapering towards the end face 70 of the first blade segment 44 and a tapering end face 112 of the infill piece 104 tapering in the opposite direction. The thickness of the first scarf connection 108 is essentially the same as the thickness t of the second spar cap portion 94. The second scarf connection 110 between the infill piece 104 and the second spar cap portion 94 is a connection between a tapering end face 114 of the infill piece 104 tapering towards the end face 70 of the first blade segment 44 and a tapering end face 116 of the second spar cap portion tapering in the opposite direction. The thickness of the second scarf connection 108 is essentially the same as the thickness t of the second spar cap portion 94.

The taper of the above scarf connection is typically 1:5 to 1:200.

The decrease of the thickness of the first spar cap portion 92 in longitudinal direction towards the end face 70 of the first blade section 44 is essentially as described above for the first embodiment and the increase of the width of the second spar cap portion 94 plus, i.e. including the infill piece 104 in longitudinal direction towards the end face 70 of the first blade section 44 is essentially as described above for the first embodiment when the infill piece 104 is considered a part of the second spar cap portion 94.

LIST OF REFERENCE NUMERALS 2 wind turbine
4 tower
6 nacelle
8 hub
10 blades
14 blade tip
16 blade root
18 leading edge
20 trailing edge
30 root region
32 transition region
34 airfoil region
36 pressure side shell part
38 suction side shell part
40 shoulder
42 segmented blade
44 first blade segment
46 second blade segment
48 joint
50 pressure side
52 suction side
54 leading edge
56 trailing edge
58 root end
60 tip end
62 female spar part
64 inner cavity
66, 66a, 66b inner end
68 open end
70 end face of first blade segment
72 protruding spar part portion of male spar part
74 end face of second blade segment
76 access opening
78 pressure side shell portion
80 inner surface
82 suction side shell portion
84 inner surface
86 pressure side spar cap
88 suction side spar cap
90 longitudinally extending scarf connection
92 first spar cap portion
94 second spar cap portion
96 outer surface of the female spar part
98 pin joint
100 first tapering end face
102 second tapering end face
104 infill piece
106 double scarf joint
108 first scarf connection
110 second scarf connection
112 tapering end face of infill piece
114 tapering end face of infill piece
116 tapering end face of second spar cap portion
L length
R radius of rotor
r distance from hub
T first thickness
t second thickness
w first width
W second width

The invention claimed is:

1. A segmented wind turbine blade having a profiled contour including a pressure side and a suction side, and a leading edge and a trailing edge with a chord extending therebetween, the wind turbine blade extending in a longitudinal direction between a root end and a tip end, the segmented wind turbine blade comprising:
- a first blade segment comprising a female spar part defining an inner cavity and having a longitudinal inner end and an opposite longitudinal open end at an end face of the first blade segment;
- a second blade segment connected to the first blade segment at a chord-wise joint and comprising a male spar part having a protruding portion protruding at the joint from an end face of the second blade segment and extending through the longitudinal open end of and into the cavity of the female spar part to be received therein;
- locking means mutually locking the female and male spar parts and thereby the first and second blade segment; and
- a pressure side spar cap connected to an inner surface of a pressure side shell portion of the first blade segment and a suction side spar cap connected to an inner surface of a suction side shell portion of the first blade segment extend from the end face thereof longitudinally over at least a majority of an extent of the first blade segment,
- wherein at least one of the pressure side spar cap and the suction side spar cap of the first blade segment comprises:
- a first spar cap portion made from pultrusions;
- a second spar cap portion connected to an outer surface of the female spar part; and
- a longitudinally extending scarf connection between the first spar cap portion and the second spar cap portion,
- wherein the longitudinally extending scarf connection is spaced from, adjoins or partially overlaps the longitudinal inner end of the female spar part in the longitudinal direction of the blade, and
- wherein the first spar cap portion has a first thickness and the second spar cap portion has a second thickness, the second thickness of the second spar cap being smaller than the first thickness of the first spar cap portion.

2. The wind turbine blade according to claim 1, wherein both the pressure side spar cap and the suction side spar cap of the first blade segment comprises a longitudinally extending scarf connection between the first spar cap portion made from pultrusions and the second spar cap portion, wherein the longitudinally extending scarf connection is spaced from, adjoins or partially overlaps the longitudinal inner end of the female spar part in the longitudinal direction of the first blade segment.

3. The wind turbine blade according to claim 1, wherein the longitudinally extending scarf connection is spaced 0 to 12 meters from the inner end of the female spar part.

4. The wind turbine blade according to claim 1, wherein the pultrusions of the first spar cap portion are made from carbon fibres or at least a majority of carbon fibres.

5. The wind turbine blade according to claim 1, wherein the second spar cap portion is made from a pre-infused piece made from fibres.

6. The wind turbine blade according to claim 1, wherein the longitudinally extending scarf connection between the first spar cap portion and the second spar cap portion is a direct connection between the first spar cap portion made from pultrusions and the second spar cap portion.

7. The wind turbine blade according to claim 1, wherein a taper or slope of the longitudinally extending scarf connection between the first spar cap portion and the second spar cap portion is 1:5 (20%) to 1:200 (0.5%).

8. The wind turbine blade according to claim 1, wherein adhesive or a prepreg layer is provided in the longitudinally extending scarf connection between the first spar cap portion and the second spar cap portion.

9. The wind turbine blade according to claim 1, wherein the longitudinally extending scarf connection is formed by an infill piece forming a double scarf joint with a first scarf connection directly to the first spar cap portion and a second scarf connection directly to the second spar cap portion.

10. The wind turbine blade according to claim 9, wherein the infill piece is a pre-infused piece made from fibres.

11. The wind turbine blade according to claim 9, wherein the taper (slope) of the first scarf connection and the second scarf connection is 1:5 (20%) to 1:200 (0.5%).

12. The wind turbine blade according to claim 9, wherein adhesive or a prepreg layer is provided in the first scarf connection between the first spar cap portion and the infill piece and the second scarf connection between the infill piece and the second spar cap portion.

13. The wind turbine blade according to claim 1, wherein a tapering of the scarf connection extends into an area of the first spar cap portion made from pultrusions in front of the longitudinally extending scarf connection to thereby gradually reduce the thickness of the first spar cap portion in front of the scarf connection.

14. The wind turbine blade according to claim 1, wherein the first spar cap portion made from pultrusions has a first width and the second spar cap portion has a second width, the second width of the second spar cap being larger than the first width of the first spar cap portion.

15. The wind turbine blade according to claim 1, wherein the first spar cap portion has a first width and the second spar cap portion has a second width, the second width of the second spar cap being larger than the first width of the first spar cap portion, and wherein the first spar cap portion and the second spar cap portion have a same cross sectional area.

16. The wind turbine blade according to claim 1, wherein the locking means comprises pin joints between the female and the male spar parts.

17. The wind turbine blade according to claim 1, wherein the inner cavity of the female spar part has a rectangular cross-sectional shape.

18. The wind turbine blade according to claim 1, wherein the female spar part has a rectangular shape in a cross-sectional view.

19. The wind turbine blade according to claim 1, wherein the first blade segment constitutes 30-90% of the entire longitudinal extent of the blade.

20. The wind turbine blade according to claim 1, wherein the first blade segment comprises the root end of the blade and is a root end segment of the blade, and the second blade segment comprises the tip end of the blade and is a tip end segment of the blade.

21. A segmented wind turbine blade having a profiled contour including a pressure side and a suction side, and a leading edge and a trailing edge with a chord extending therebetween, the wind turbine blade extending in a longitudinal direction between a root end and a tip end, the segmented wind turbine blade comprising:
- a first blade segment comprising a female spar part defining an inner cavity and having a longitudinal inner end and an opposite longitudinal open end at an end face of the first blade segment;

a second blade segment connected to the first blade segment at a chord-wise joint and comprising a male spar part having a protruding portion protruding at the joint from an end face of the second blade segment and extending through the longitudinal open end of and into the cavity of the female spar part to be received therein;

locking means mutually locking the female and male spar parts and thereby the first and second blade segment; and a pressure side spar cap connected to an inner surface of a pressure side shell portion of the first blade segment and a suction side spar cap connected to an inner surface of a suction side shell portion of the first blade segment extend from the end face thereof longitudinally over at least a majority of an extent of the first blade segment, wherein at least one of the pressure side spar cap and the suction side spar cap of the first blade segment comprises:

a first spar cap portion made from pultrusions;

a second spar cap portion connected to an outer surface of the female spar part; and a longitudinally extending scarf connection between the first spar cap portion and the second spar cap portion, wherein the longitudinally extending scarf connection is spaced from, adjoins or partially overlaps the longitudinal inner end of the female spar part in the longitudinal direction of the blade, and wherein the first spar cap portion has a first width and the second spar cap portion has a second width, the second width of the second spar cap being larger than the first width of the first spar cap portion.

* * * * *